Nov. 11, 1969     T. L. SHEPHERD     3,477,816
METHOD AND APPARATUS FOR THE PRODUCTION OF CARBON BLACK
Filed Oct. 24, 1965     4 Sheets-Sheet 4
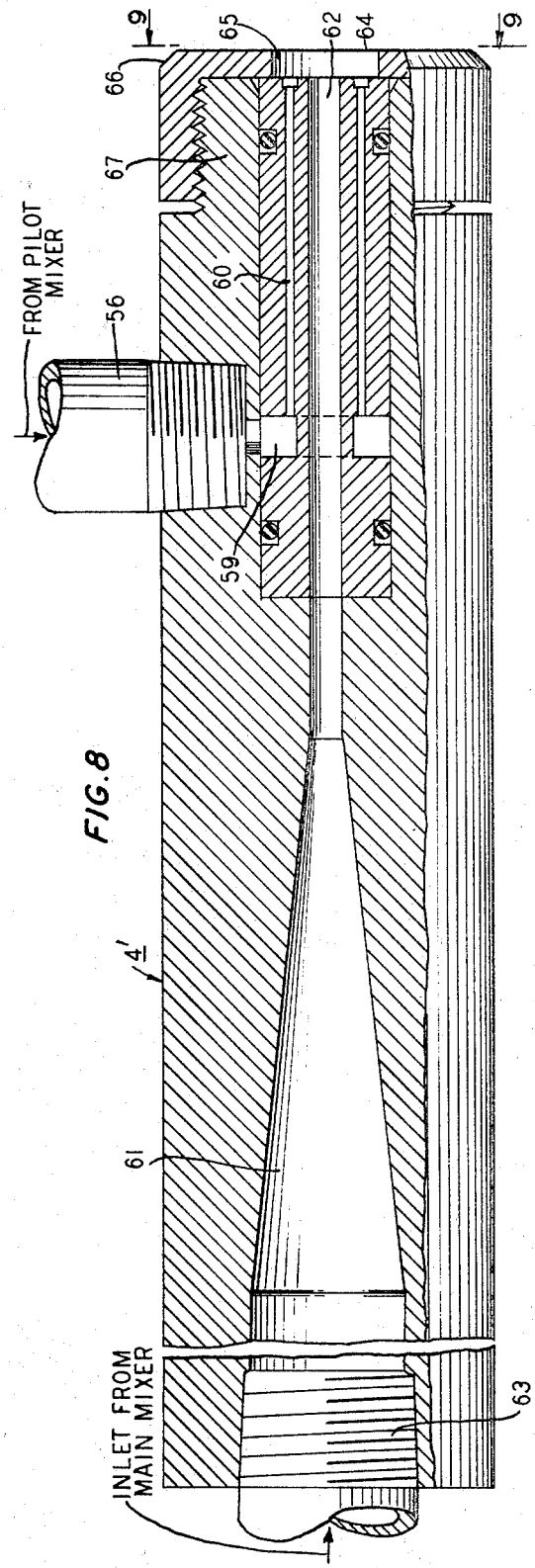
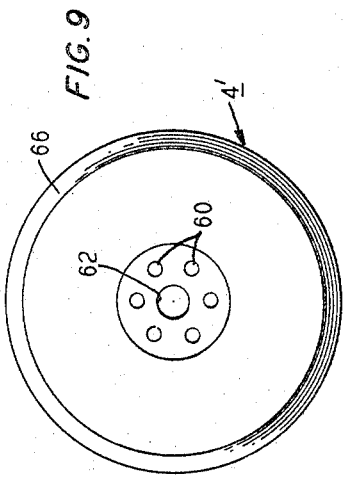
INVENTOR
THOMAS L. SHEPHERD
BY
ATTORNEY

United States Patent Office

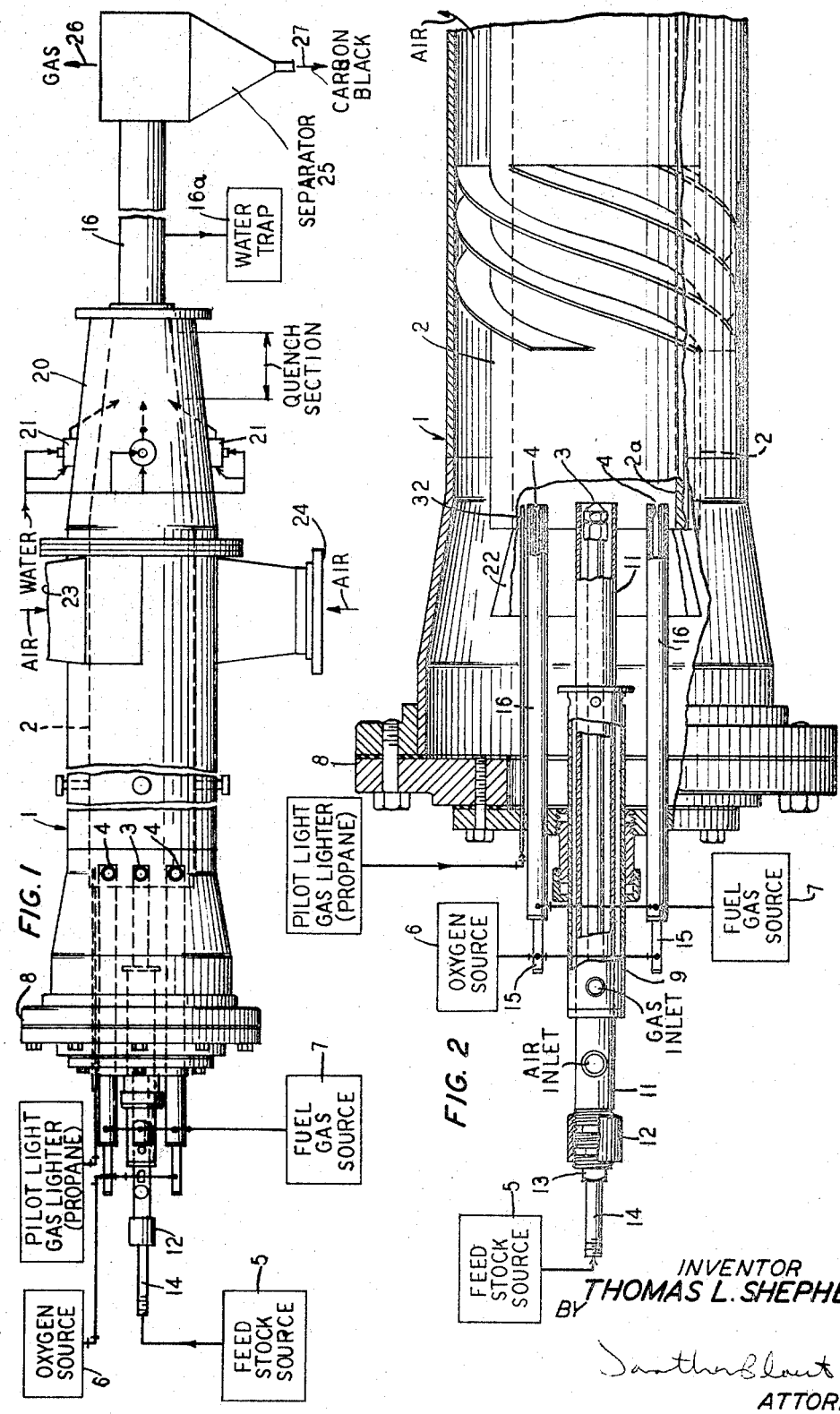

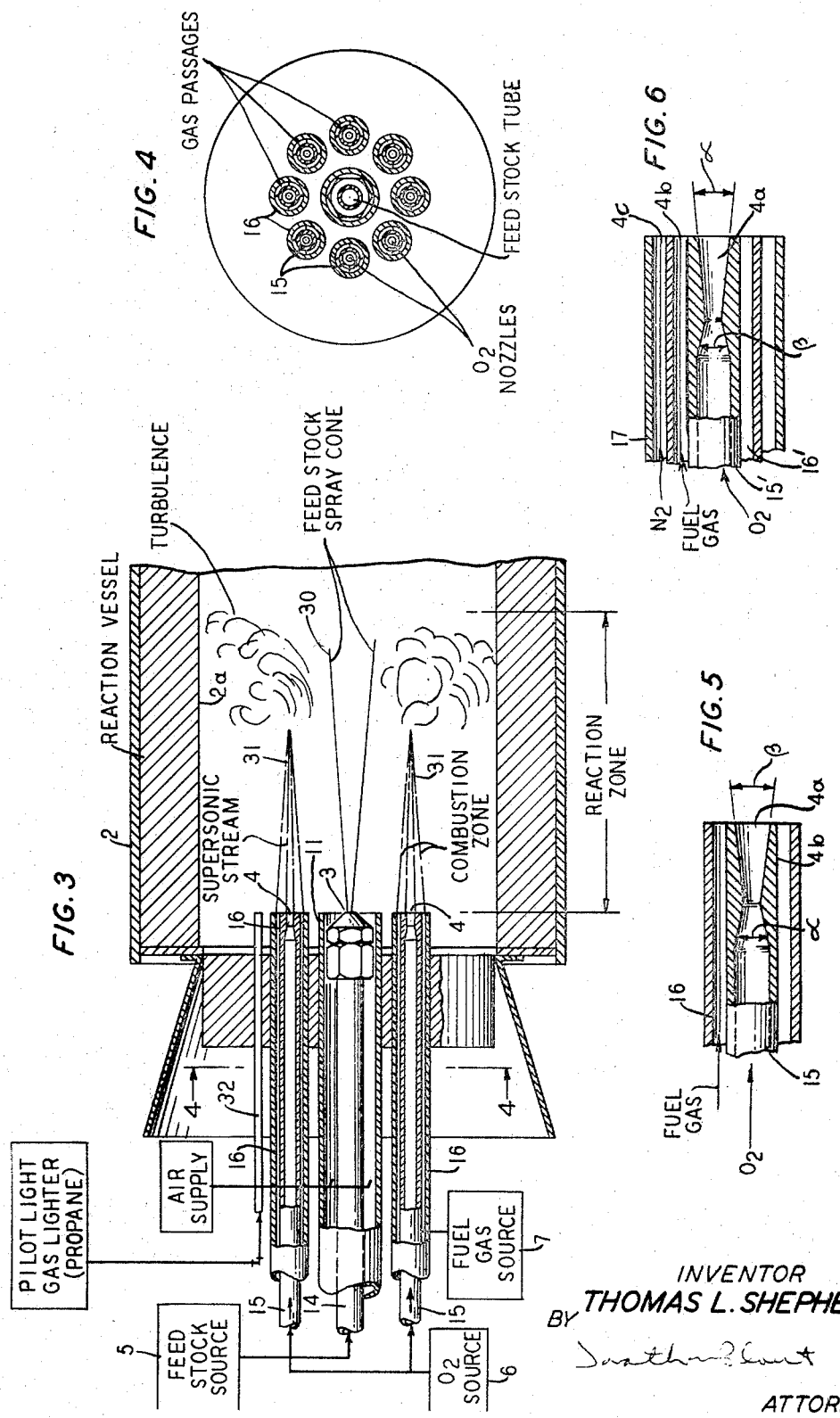

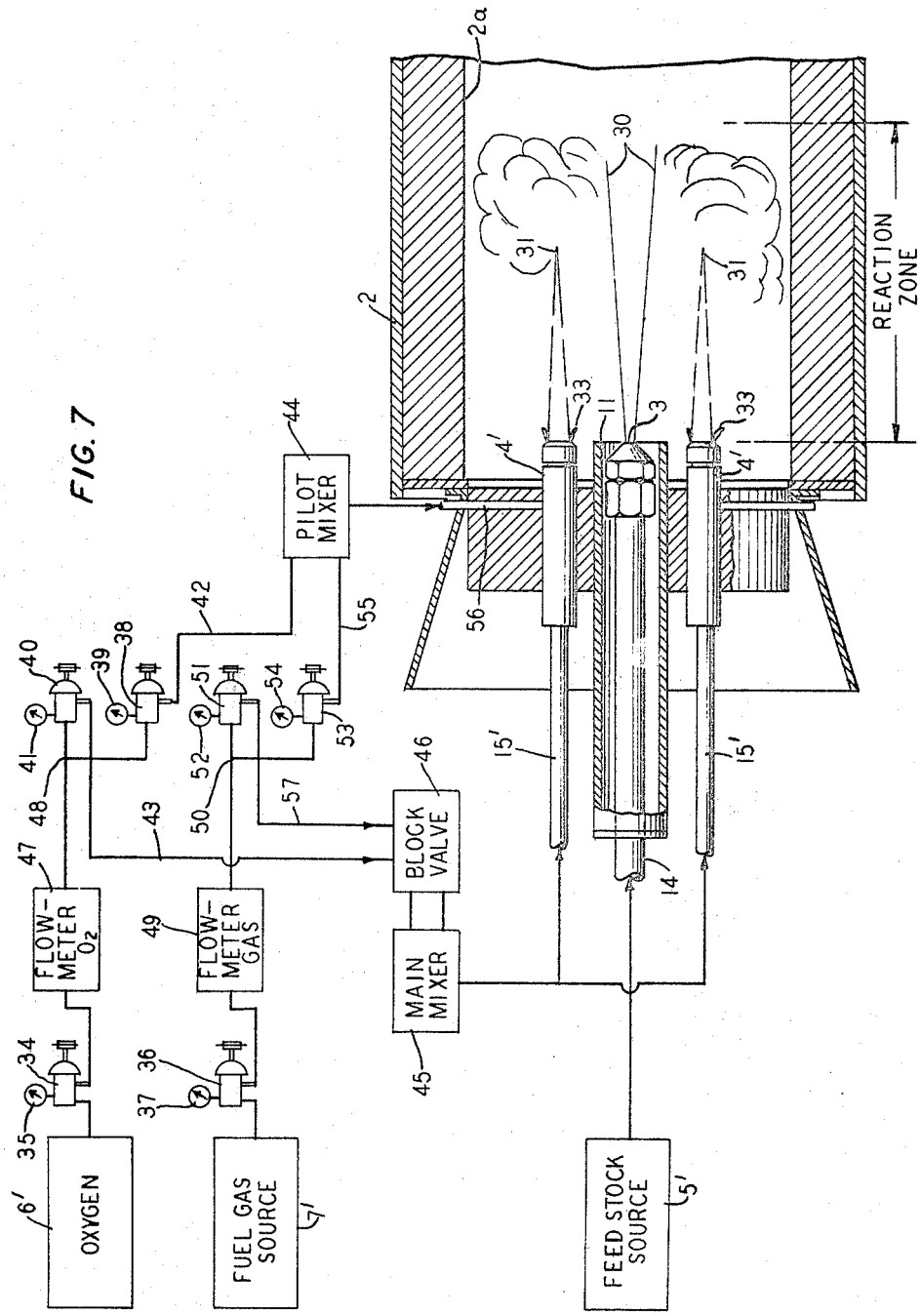

3,477,816
Patented Nov. 11, 1969

3,477,816
METHOD AND APPARATUS FOR THE PRODUCTION OF CARBON BLACK
Thomas L. Shepherd, Essex Fells, N.J., assignor to Air Reduction Company, Incorporated, New York, N.Y., a corporation of New York
Filed Oct. 24, 1965, Ser. No. 504,776
Int. Cl. C09c *1/50*
U.S. Cl. 23—209.4        11 Claims

ABSTRACT OF THE DISCLOSURE

This invention relates to an improved system for manufacturing carbon black in which a central nozzle, which emits a hydrocarbon spray, is surrounded by a plurality of auxiliary nozzles from which high velocity oxy-fuel flames are emitted.

---

This invention relates in general to the production of carbon black and other products of oil decomposition in a furnace reactor; and more particularly to a method and apparatus in which heat for the cracking process is supplied by separate combustion.

In the present state of the art, a typical method of manufacturing carbon black is by subjecting a hydrocarbon feed stock to sufficient heat to cause it to crack or decompose forming a heavy, black smoke which comprises carbon particles suspended in the effluent gases, which include carbon dioxide and water vapor. Heat for the cracking process may be supplied either by a partial combustion of the feed stock, or by various other means, including a separate source of combustion.

In order to produce an optimum carbon-black product, a fast reaction is desirable in which the carbon black particles are quickly formed. Further, once they are formed, it has been found desirable to swiftly remove them from the reaction zone in order to prevent graphitization. This requires that the reaction take place in a highly turbulent zone, at high reaction temperature, and within a short reaction time.

One possibility for achieving the above results is by using highly concentrated oxygen to increase the flame temperature in the reactor, and to provide higher rates of heat transfer into the reactor, resulting in a more vigorous combustion process. It has been found, however, that when concentrated oxygen is added to the normal combustion air in a reaction chamber, certain disadvantages will occur. These include excessive consumption of the feed stock by oxidation, and the development of excessively high temperatures in the reactor structure and refractories.

Accordingly, it is the object of the present invention to provide an improved method and apparatus for producing carbon black, more specifically by increasing the reaction temperature, the speed of the reaction, and the turbulence of the flow surrounding the reaction, without excessive oxidation of the fuel stock, or the development of excessive temperatures in the reactor structure.

These and other objects are realized in accordance with the present invention in a furnace reactor wherein hydrocarbon feed stock emitted in the form of a divergent spray cone centered along the principal axis of the reaction chamber is surrounded by a symmetrical array of high velocity oxy-fuel flames which jet out parallel to the axis. The flame jets are sufficiently spaced from the feed stock nozzle in a radial direction so that they do not come in direct contact with the unreacted feed stock spray, confluence taking place beyond the flame tips between the highly turbulent, high temperature combustion products of the heating flames and the feed stock spray.

In an embodiment of the invention, the central feed stock nozzle is surrounded by a plurality of auxiliary nozzles. Each of the latter comprises a central port consisting of a nozzle with a small angle of divergence for supplying a stream of commercially pure oxygen at approximately the speed of sound, surrounded by an annular port for supplying sufficient fuel gas for complete combustion with the latter in a high velocity, high temperature flame, the principal effluent products of which are carbon dioxide and water vapor. These combustion products, together with air supplied to the reactor through a spiral path, create a high degree of turbulence in the high-temperature reaction zone beyond the tips of the flames, where the atomized feed stock decomposes into carbonaceous smoke. The latter passes through conventional cooling means, such as a quench section in which it is subjected to inwardly-directed sprays of water, a water trap for removing the excess water, and finally, to conventional separating means for separating out the carbon black from the effluent gases.

In accordance with a modification of the foregoing embodiment, an extra annular port is added to the auxiliary nozzles for supplying a stream of nitrogen to act as a sheath surrounding each of the high velocity oxy-fuel flames, to protect the feed stock from possible oxidation.

In accordance with a second embodiment of the invention, the high velocity gases supplied to the oxy-fuel flame, instead of being post-mixed beyond the burner tip, as in the previously mentioned embodiment, are premixed and supplied to the burner in a high-velocity homogeneous mixture. In order to successfully operate a system in which the burner gases are pre-mixed, a specially designed burner-tip assembly is employed in connection with which portions of the oxygen and fuel gas are separated out from the main high pressure streams, and introduced as a mixture at substantially lowered pressure to maintain a number of pilot flames surrounding the high-velocity flame.

The following are among the advantages over the prior art of the methods and apparatus contemplated in accordance with the present invention:

(1) A very great velocity difference is created between the feed stock and heating medium in the mixing region.

(2) A highly energetic and fine scale turbulence is created in the mixing region.

(3) Because of the foregoing, there is extremely rapid heating of the feed stock in the mixing region.

(4) Because the apparatus of the present invention is designed to prevent contact between the feed stock and unreacted oxygen, and to remove the reactor structure from contact with the high temperature flames and hot combustion products, it is possible to use concentrated oxygen as a component of the heating flame.

(5) The high velocity of the oxygen stream supplied to the auxiliary nozzles produces great flame stiffness and directional stability, resulting in positive location of the heating flames, and providing a flow pattern within the reactor which is accurately predictable.

(6) The construction of the burner parts, in accordance with the present invention, is simple and inexpensive.

These, and other objects, features and advantages of the invention will be apparent to those skilled in the art from a detailed study of the specification hereinafter, with reference to the attached drawings, in which:

FIGURE 1 is a schematic showing of an over-all system for producing carbon black, including a reactor designed in accordance with a preferred embodiment of the present invention;

FIGURE 2 is a showing, in longitudinal section, of the burner end of the carbon black reactor of FIGURE 1, including the outer shell;

FIGURE 3 is a showing, in longitudinal section, of the burner end of the carbon black reactor of FIGURE 1 with the outer shell removed;

FIGURE 4 is a cross-sectional showing of the structure of FIGURE 3, looking in the direction of arrows 4—4;

FIGURE 5 is an enlarged sectional showing of the auxiliary nozzles 4 of FIGURE 3, including oxygen and fuel-gas ports;

FIGURE 6 is an enlarged sectional showing a modification of the auxiliary nozzles of FIGURE 3, which include nitrogen, in addition to oxygen and fuel-gas ports;

FIGURE 7 is a schematic system showing, coupled with a showing in longitudinal section of the burner end of the carbon-black reactor, in a modification of the present invention wherein the gas supply in the oxy-fuel jets is pre-mixed.

FIGURE 8 is an enlarged showing in longitudinal section of one of the special nozzles 4' of the burner of FIGURE 7; and FIGURE 9 is a cross-sectional showing of the nozzle of FIGURE 8.

The system combination shown in FIGURE 1 for producing carbon black comprises a cylindrical outer shell 1 which houses a furnace reactor 2. The latter includes a feed stock nozzle which is designed to project a divergent conical stream of spray of hydrocarbon feed stock centered on the principal axis of the reactor 2. A particular feature of the present invention is the burner array which will be described in substantial detail hereinafter. This comprises a plurality of auxiliary nozzles 4, symmetrically disposed in a circle surrounding feed stock nozzle 3, and designed to produce jets of high velocity oxy-fuel flame extending into the reactor 2 in a direction parallel its axis. These are sufficiently removed from the axis of the reactor 2 to avoid any direct contact between the flames and the feed stock spray.

The reactor 2 is surrounded by a helically moving sheath of air sucked in through vents 23 and 24 which serves to transfer heat from the hot combustion gases down stream to the hydrocarbon reaction zone.

The high temperature, high velocity combustion products of the oxy-fuel flame, comprising principally carbon dioxide and water vapor, together with a body of turbulent air, transfer heat into the reaction zone which brings about cracking or decomposition of the hydrocarbon feed stock into its components, which are ideally carbon and hydrogen. The hot, carbonaceous smoke, which in actual practice may include various hydrocarbon gases, such as deconstituted methane, together with carbon dioxide, carbon monoxide, hydrogen and water vapor, passes beyond the reaction zone into a cooling area, where it is initially cooled by heat transfer with the mass of helically moving air between reactor 2 and the outer shell 1, and then passes on for additional cooling by conventional means, such as in the quench section 20. For example, the quench section 20 may assume the form indicated in FIGURE 1 of U.S. Patent to Krejci, issued Nov. 21, 1961. Alternatively, any other method ordinarily employed for cooling the hot reaction products from a carbon black reactor may be used in the present combination.

The cooled reaction products, including carbon black in suspension, are led through the connecting channel 16 which includes a water trap 16a for removing condensed water vapor, and then into a separation zone 25 which may include any of the devices normally employed for separating out the crystals of carbon black from the effluent gases, such as one or more cyclone separators, bag filters, electrical precipitators, or any combination of such elements. The gaseous by-products of the reaction pass off through the outlet vent 26, whereas the carbon black collected in the separator zone 25 is recovered from the outlet 27.

Let us refer, now, to FIGURES 2 and 3 of the drawings which show views in longitudinal section of the burner portion of reactor 2, including the outer shell 1, and with the shell 1 removed, respectively; and to FIGURE 4 showing the latter figure in cross section. In each figure, the configuration of the feed stock supply nozzle and burner array is in accordance with the present invention.

In the specific example to be described herein as an illustration of the present invention, the outer reactor shell 1 is formed of carbon steel pipe, 16 feet long. At one end of reactor shell 1, immediately adjacent quench section 20, a pair of tangential air inlets 23 and 24 jut out in diametrically opposite directions from just beneath the curved surface of the shell. They protrude more than ten inches in each direction to form at each side a rectangular inlet pipe about 10 inches wide and 15 inches deep, in an axial direction, through which air is sucked or forced into the outer chamber between the shell 1 and the reactor 2. From air inlets 23 and 24, at its right-hand end, reactor shell 1 extends longitudinally with a uniform cross-sectional dimension of 20 inches outer diameter and 19¼ inches inner diameter, to about 15 inches from the left-hand end, where it flares slightly to a maximum outer diameter of about 24 inches, terminating in a flanged end-portion which is closed by means of a composite flanged fitting 8 with a matching flanged portion, the two being held together by a plurality of screws around the periphery.

Longitudinally disposed within the outer reactor shell 1, and concentric therewith in the cross-sectional plane, is an internal stainless steel tube 2, about 14 feet, 10 inches long, approximately 14 inches in outer diameter and 13¼ inches in inner diameter. Both ends of the internal reactor tube 2 are open, the right-hand end feeding directly into quench section 20 and the left-hand end located about 20 inches, in an axial direction, inside the outer end of the composite, flanged closure 8.

The inner wall of the internal reactor tube 2 is lined with a castable refractory 2a, such as, for example, alumina, or alternatively, magnesia, zirconia, or thoria, having a thickness in a radial direction of 1⅝ inches. Accordingly, the inner diameter of the reactor 2 is 10 inches.

Wound spirally on the outer periphery of reactor tube 2 are a plurality of vanes 24, spaced apart about 4 inches in a lengthwise direction. These serve to direct a stream of air sucked or forced in through the tangential inlet pipes 23 and 24 to travel in a helical path in the space between reactor 2 and the outer shell 1 to the flared end of the latter, where it flows in reverse direction into the open end of reactor 2 through grit eliminator 22, which is in the form of the hollow frustrum of a cone having oblique inlet slots. Thus, the air flows into the body of reactor 2 in a highly turbulent state.

Mounted in an axial position in the flanged closure 8 by means of a conventional nipple arrangement, is a 22 inch long stainless steel pipe 9, of which 12 inches protrudes outside of the closure, and the remainder inside of the enclosure forming a passage into the end portion of the reactor shell 1. Pipe 9, which is connected at its outer end to a source of natural gas, is 3½ inches in outer diameter, and 3⅜ inches in inner diameter. Extending through and concentric with pipe 9 is a longer pipe 11, which is three inches in outer diameter and 2¾ inches in inner diameter, and which serves as a conduit for the passage of air. The outer end of pipe 11 terminates in a screw-threaded steel coupling 12 which is closed by a steel plug 13. The over-all length of pipe 11 is approximately 44 inches from coupling 12 at the left-hand end, through enclosing pipe 9, terminating at its inner open end, about 1½ inches inside of the burner end of reaction vessel 2, just beyond the end of feedstock nozzle 3 which it encloses. Air is supplied through pipe 11 to reaction vessel 2, surrounding feedstock nozzle 3.

Disposed inside of, and concentric with pipe 11 is a stainless steel oil feed pipe 14, ¾ of an inch in outer diameter, and ⅝ of an inch in inner diameter, for supplying an atomized mixture of feedstock from a source 5. Preferred, for this purpose, is a heavy fuel oil comprising a mixture of hydrocarbons, known in the art as residual fuel oil, having the consistency of half oil and half tar. A suitable oil for this purpose is identified as No. 6 heavy industrial fuel oil (Federal Specification Board, bunker oil "C") identified in the U.S. Bureau of Standards Commercial Standard CS12–29. This is preferably preheated to a temperature of between 120 and 180° F. Alternatively, other hydrocarbon oils or gases may be employed for this purpose, such as, for example, methane $CH_4$, ethane $C_2H_6$, propylene $C_3H_6$, propane $C_3H_8$, acetylene $C_2H_2$, or others, either singly or in various mixtures.

In the present illustration, nozzle 3 is of conventional design, containing for example a number of perforations, and is so constructed as to direct a fine spray of feedstock so that it forms a cone of divergent spray, the apex angle of which, in the plane of FIGURE 3, is, say, 10°, although this angle may lie within the range 5 to 20°. The heated feedstock flows into nozzle 3 at a rate, in the present embodiment, of 200 feet per second, although this may vary over the range 50 to 600 feet per second. Designating the flow rate in volume terms, the feedstock in the present illustration flows at the rate of 2 gallons per minute; but for different applications, the volume flow rate may be varied within the range 0.5 to 5 gallons per minute.

In the present example, the flow of methane gas in the pipe 9 is at a volume rate of 100 cubic feet per minute; and the rate of air flow in pipe 11 has a volume rate of 150 cubic feet per minute. Together, these streams of gas prevent carbon from forming on and clogging the openings of nozzle 3.

In accordance with a particular feature of the present invention, a plurality of auxiliary nozzles 4, six in number in the present embodiment, surround the feedstock nozzle 3 at a radial distance of, say, 3 inches. It will be apparent that this radial distance may be varied between one and three inches in different embodiments; and the number of auxiliary nozzles may be varied to meet different requirements.

Referring to FIGURE 5 which shows one of the nozzles 4 in enlarged section, it is seen that the central channel 4a of each nozzle is of convergent-divergent form, the convergent angle $\alpha$ being typically about 30°, and the divergent angle $\beta$ being between 6 and 12° in the plane of the figure. In the present embodiment, in which the angle $\beta$ is 12°, the nozzle has a throat diameter, about 0.2 of an inch in cross section, which broadens out to ³⁄₁₆ of an inch across the divergent end. Channel 4a, which serves for the transmission of oxygen, is surrounded by an annular passage 4b, from ¹⁄₆₄ to ³⁄₆₄ of an inch in internal cross section, which serves as a port for fuel gas. It will be noted that at the ends of the nozzles 4, in each case, the metal tube separating center channels 4a from the gas ports 4b, has a thickness of about ¹⁄₃₂ of an inch. This thickness provides a "bluff body" or "flame holder" which serves to sustain the burner flame near the ends of the nozzles, since the flame would otherwise be carried out the end of the combustion chamber by the high velocity gases.

The central oxygen vent 4a in each of the auxiliary nozzles 4 is connected to a conduit 15, which comprises a stainless steel pipe ⅜ of an inch in inner diameter and ⁷⁄₁₆ of an inch in outer diameter, and, say, 36 inches long, which is connected to a source 6 of oxygen 99.5 percent pure, or what is known in the art as "commercially pure." The gas port 4b surrounding the convergent-divergent center portion 4a of each of nozzles 4, is a continuation of gas channel 16 which encloses each of the conduits 15 concentrically. Each of conduits 16, which is a stainless steel pipe having, say, a half-inch inner diameter and ⁹⁄₁₆ inch outer diameter, is mounted in symmetrical array held in place in nipple fitting in the flanged fitting 8, and arranged in a circle which, in the present embodiment, has a three inch radius in the manner indicated in FIGURE 4. Each of the conduits 16 is extended out to make common connection to a source of fuel gas 7. The latter may comprise, for example, natural gas or methane $CH_4$, propane $C_3H_8$, or any other low-cost fluid fuel, such as, for example, ethyl alcohol vapor $C_2H_5OH$, or one of the unsaturated hydrocarbons, such as the olefins.

The oxygen flows through conduit 15 at a rate approximately 1,000 feet per second, at ambient temperature, and a gauge pressure of between 20 and 100 pounds per square inch, at the entrance to the convergent-divergent nozzle 4a. In the present illustration, the volume rate of flow of oxygen at the nozzle is, say, 160 cubic feet per minute.

The fuel gas flows through conduit 1 at a rate between about 200 and 1,000 feet per second, at ambient temperature, the gauge pressure adjacent nozzle 4 being within the range 20 to 60 pounds per square inch. For preferred results in accordance with the present invention, the ratio of commercially pure oxygen in conduit 15 to fuel gas in conduit 16 is of the range of from 1 to 2½.

A flame is initially ignited between the high velocity gases emerging from the tips of nozzles 4 by any of the means well-known in the art, such as, for example, a pilot light supported by a mixture of air and propane which passes into the reaction vessel 2, through a small conduit 32, establishing a pilot flame adjacent the area of the burner nozzles 4. The flame thus ignited between the high velocity gases emerging from the tips of each of nozzles 4, extends from six to twelve inches in an axial direction, the combustion zone 17 forming a sheath on the outer periphery of each of the jets, producing temperatures in the hottest portion of the flame within the range 4,000 to 5,100° F.

In accordance with an alternative, it is contemplated that hydrogen could be added to the mixture of oxygen and fuel gas emerging from the auxiliary nozzles 4 in order to extend the range of flame temperatures upward.

It will be apparent that the burner system of the present invention is so designed that it produces oxy-fuel flames of great stiffness which jet out at only a slight angle of divergence, and are sufficiently removed in a radial direction from the feed-stock nozzle 3, so that there is practically no confluence with the unburned feedstock, the oxygen being substantially consumed in the combustion supporting the high temperature flames. On the other hand confluence occurs between the combustion products of the high temperature flames and the cone of atomized feed-stock in a zone which begins several inches beyond the tips of the heating flame. Because of the high velocities of the gas streams feeding the flames at burner nozzles 4, and because of the swirling pattern with which air enters the burner end of the reactor 2, there is a high degree of turbulence in the reaction area. This speeds up the cracking reaction in which the hydrocarbon feed-stock is broken down into its components. Ideally, the hydrocarbons are broken down into hydrogen and carbon, with no substantial oxidation or recombination taking place, thereby producing a maximum yield of carbon black of fine crystal size since the turbulence prevents agglomeration to any large degree. In actual practice, in addition to hydrogen and carbon, the reaction products include various of the lighter hydrocarbons, such as ethane, unreacted or reconstituted, propane, propylene, ethylene, ethane, acetylene, etc., and also carbon dioxide and carbon monoxide.

In accordance with a modification of the embodiment just described, the auxiliary nozzles 4 are made more complex, as indicated in FIGURE 6 of the drawings. Instead of only two gas passages, 4a and 4b, as shown in FIGURE 5, the modified nozzles of FIGURE 6 include three gas passages, 4a, 4b, and 4c, the first two accommodating oxygen and fuel gas, as before, and the last, 4c, accommodating a stream of nitrogen flowing in a pipe 17, which is concentric with pipes 15 and 16, as indicated in FIGURE 3. The pipe 17 is connected to a source of nitrogen (not shown) which flows in pipe 17 at the rate of 50 cubic feet per minute, and at a pressure of 20 pounds per square inch, absolute, at room temperature, into the port 4c. In the present illustrative embodiment, the respective volume flows are as follows: oxygen, 160 cubic feet per minute; fuel gas, 100 cubic feet per minute; and nitrogen, 50 cubic feet per minute, making the respective volume ratios 52 percent oxygen, 32 percent fuel gas, and 16 percent nitrogen. The function of the added nitrogen is to form a sheath around the combustion area of the flame 31 which serves to protect the feed-stock from oxidizing materials such as carbon dioxide and water in the fuel gas.

Another embodiment of the invention is indicated in FIGURE 7 of the drawings. This shows the burner end of the reaction vessel 2 in a longitudinal section similar to that shown in FIGURES 1–4 except that the gas which feeds each of the high velocity flames is pre-mixed and fed in through a modified system indicated schematically.

The modified nozzles 4', designed to accommodate the pre-mixed stream of high velocity gas, are shown in enlarged longitudinal section and cross section, respectively, in FIGURES 8 and 9.

The function of the arrangement shown in FIGURES 7, 8, and 9 is to provide for a plurality of pilot flames 33, supported by a mixture of low pressure gas, to surround each of high velocity flames 31, which would otherwise be carried along with the high velocity gas, through the reaction chamber and out the other end.

Referring in detail to FIGURE 7, oxygen is supplied from a conventional high pressure drum 6' through a regulator valve 34, at a pressure of, say, 150 pounds per square inch, as measured in gauge 35, and at a flow rate of, for example, 160 cubic feet per minute, as measured by the flowmeter 47, which may be of any of the types well-known in the art for the measure of gas flow. This then passes through the junction 48, where a portion, say, about 5 percent by volume, flows into the pilot flame regulator 38, where the pressure is regulated to about 10 pounds per square inch, as indicated in the gauge 39.

Simultaneously, a stream of fuel gas, such as, for example, propane, flows out of the high pressure drum 7', through a regulator valve 36, at a pressure of, say, 100 pounds per square inch, as indicated in the gauge 37, and through the flowmeter 49 at a measured rate of 40 cubic feet per minute. This stream then flows into junction 50 where a portion, say, 3 percent by volume flows into the pilot flame regulator 53, where the pressure is regulated to, say, between 4 and 6 pounds per square inch, as indicated in the gauge 54.

The two streams from pilot flame regulators 38 and 53 then pass through the respective conduits 42 and 55 to the pilot mixing chamber 44, where they are mixed together before passing as a homogenous stream flowing at the rate of 8.5 cubic feet per minute into the conduit 56 which supplies the pilot flames 33 through special channels in the modified nozzles 4', in a manner to be described presently.

In a similar manner, the main stream of oxygen, representing 95 percent of the flow, passes from junction 48 through the main flame regulator 40 where its pressure is regulated to between 60 and 150 pounds per square inch, as indicated in gauge 41. Likewise, the main stream of fuel gas, representing 97 percent of the flow, passes from junction 50 into main flame regulator 51, where it is adjusted to a pressure of between 40 and 100 pounds per square inch, as indicated in gauge 52. These two main streams, pass through the conduits 43 and 57, respectively, through the block valve 46, and into the main mixing chamber 45, where the gases are mixed to form a homogeneous, high pressure stream.

From the mixing chamber 45 the high velocity stream, flowing at a rate of 190 cubic feet per minute, passes through conduit 15' into the main channel of the modified stainless steel nozzles 4', shown in enlarged detail in FIGURES 8 and 9.

Each of nozzles 4' comprises a cylindrical portion 5 inches in outer diameter and about 26 inches in over-all length, and is screwed onto the conduit 15' by means of the screw connection 63. The main channel of each of nozzles 4' has a cylindrical section of inner diameter about 2¼ inches, matched to the screw section 63. The cylindrical section leads into a convergent section 61, which is 8¼ inches long, where the diameter is narrowed down to about one-half inch. In the present embodiment, section 62 which follows, has a uniform inner diameter extending to the external end of the nozzle, although it can alternatively have a slight angle of divergence up to not more than about 4°. A stainless steel cap 66, about one-half inch thick and having an outer diameter flush with that of the cylinder, screws onto a nipple 67 of reduced diameter protruding for the last 2 inches at the outer end of the nozzle 4'. Cap 66 has an opening about one and one-half inches in diameter which is centered on channel 62.

For convenience in machining the parts, a separate cylindrical element having an over-all diameter of 2 inches, and about 8 inches long, may be fitted in integral relationship into a matching cylindrical opening in the external end of the nozzle. In addition to containing the last 8 inches of the main channel 62, this fitting is machined, in a position about 6 inches back from the end of the nozzle, to include an annular indentation, about ⅝ of an inch wide and ⅝ of an inch deep. This is disposed to communicate with the termination of conduit 56 from the pilot mixer 44, which screws into a lateral position on each of nozzles 4'.

Machined parallel to the main channel 62 are a plurality of smaller channels 60, each one-quarter of an inch in diameter, which communicate between the annular chamber formed by indentation 59 and the opening 64 in cap 66. In the present embodiment, these small channels are six in number and are symmetrically arranged around the central channel 62, with their centers spaced a radial distance of about one-half of an inch from the center of the external face of the nozzle.

Whereas a specific nozzle design is set forth in the foregoing example described with reference to FIGURES 8 and 9, numerous modifications, employing the same principles of fluid dynamics will be apparent to those skilled in the art. For example, instead of a single integrated structure, the nozzles 4' may each comprise a composite consisting of a central tube serving as a conduit for the high velocity gas mixture, surrounded by a cluster of smaller pilot tubes, which may be mounted in a frame, or soldered together or otherwise held in place in relation to the central tube in any manner known in the art.

Thus, it will be seen that the low pressure, low velocity gas from the pilot mixer 44 is fed through the small diameter channels 60 to provide a plurality of pilot flames surrounding each of the principal high velocity flames 31, fed in each case by a high velocity, high pressure mixture passing from the main mixing chamber 45, through convergent channel 61 and substantially uniform channel 62. This novel arrangement contributes stability to the operation of the high velocity flame, which would otherwise move rapidly through the reaction chamber 2 and out the end.

It will be apparent that the embodiment of FIGURES 7, 8, and 9 can be modified in the manner previously described with reference to the embodiments of FIGURES 3, 4, and 5, to include a separate annular port about the nozzles 4' for supplying nitrogen as a protective sheath for the flame.

Furthermore, it will be apparent to those skilled in the art that the invention is not restricted to the specific forms of apparatus or dimensions or method limitations disclosed herein by way of illustration; but that rather the scope of the invention is defined in the appended claims.

I claim:

1. A system for producing carbon black comprising a heat-resistant reaction vessel, a nozzle disposed in said reaction vessel and constructed to direct a spray of atomized feed-stock in the form of a divergent cone centered on the longitudinal axis of said reaction vessel, heating means comprising a plurality of auxiliary nozzles directed substantially parallel to said feed-stock nozzle and located symmetrically about a circle substantially concentric therewith, each said auxiliary nozzle comprising at least two concentric conduits, means for forcing substantially pure oxygen at a high velocity through the inner of said conduits, means for forcing fuel gas through another of said conduits, said auxiliary nozzles directing oxy-fuel flames in a direction substantially parallel with the axis of said spray cone for a distance insufficient to provide direct contact between said high velocity oxy-fuel flames and said feed-stock.

2. A system in accordance with claim 1 in which said first forcing means forces commercially pure oxygen through said inner conduit at about the speed of sound.

3. A system in accordance with claim 1 wherein each of said auxiliary nozzles comprises at least three concentric conduits, and means for forcing gaseous nitrogen through the outer of said conduits.

4. A system for producing carbon black comprising a heat resistant reaction vessel, a nozzle disposed in said reaction vessel and constructed to direct a spray of atomized feed-stock in the form of a divergent cone axially of said reaction vessel, heating means comprising a plurality of auxiliary nozzles surrounding said feed-stock nozzle, each of said auxiliary nozzles having a central channel and passage means surrounding said channel, means for forcing a gas comprising a substantial component of oxygen through said central channel and means for forcing fuel gas through said passage means, said auxiliary nozzles directing oxy-fuel flames in a direction substantially parallel with the axis of said spray cone for a distance insufficient to provide direct contact between said high velocity oxy-fuel flames and said feed-stock.

5. A system for producing carbon black which comprises in combination a heat resistant reaction vessel, a nozzle constructed to direct a spray of atomized feed-stock in the form of a divergent cone axially in said reaction vessel, a plurality of auxiliary nozzles surrounding said feed-stock nozzle, each of said auxiliary nozzles having a central channel with a convergent portion and a divergent portion downstream of said convergent portion, the angle of convergence exceeding the angle of divergence, means for forcing a gas comprising a substantial component of oxygen through said central channel, passage means surrounding each of said channels, means for forcing fuel gas through said passage means to support at each of said nozzles a high velocity oxy-fuel flame which extends outwardly from each of said auxiliary nozzles for a distance insufficient to make direct contact between said flame and said spray cone of feed-stock.

6. A system in accordance with claim 5 in which said first-mentioned gas is commercially pure oxygen, said first-mentioned forcing means forcing said gas into said auxiliary nozzles at approximately the speed of sound.

7. The method of producing carbon black in a furnace reactor which comprises the steps of directing an atomized spray cone of hydrocarbon feed-stock axially in said reactor in such a manner that said spray diverges not more than about 15° in any direction from the axis of said cone, surrounding said spray cone with a plurality of high velocity oxy-fuel flames, said oxy-fuel flames being spaced in a radial direction and being of a length to avoid direct contact with said spray cone, supplying each of said oxy-fuel flames with a stream of gas comprising a substantial component of oxygen surrounded by a stream of fuel gas to produce a flame temperature within the range 4,000° F.–5,100° F., whereby heat for decomposing said hydrocarbon is transferred from said oxy-fuel flames to said hydrocarbon spray cone by highly turbulent gases including the combustion products of said oxy-fuel flames.

8. The method in accordance with claim 7 wherein said oxy-fuel flames are fed by streams of oxygen having a velocity approximating that of sound.

9. The method in accordance with claim 7 including directing turbulent masses of air into said furnace reactor.

10. A system in accordance with claim 5 including further passage means surrounding said first-mentioned passage means, and means for forcing gaseous nitrogen through said further passage means.

11. The method in accordance with claim 7 including further supplying each of said oxy-fuel flames with a stream of gaseous nitrogen which surrounds said stream of fuel gas.

References Cited

UNITED STATES PATENTS

| 2,623,811 | 12/1952 | Williams | 23—209.6 |
| 3,102,790 | 9/1963 | Perry | 23—259.5 |
| 2,625,466 | 1/1953 | Williams | 23—209.6 |
| 3,003,854 | 10/1961 | Heller | 23—209.4 |
| 3,256,066 | 6/1966 | Higgins | 23—259.5 |

EDWARD J. MEROS, Primary Examiner

U.S. Cl. X.R.

23—259.5